US00RE40371E

(19) United States
(12) Reissued Patent
Ichimura et al.

(10) Patent Number: US RE40,371 E
(45) Date of Reissued Patent: Jun. 10, 2008

(54) OPTICAL DISC RECORDING/ REPRODUCTION APPARATUS AND METHOD

(75) Inventors: Isao Ichimura, Kanagawa (JP); Fumisada Maeda, Tokyo (JP); Kenji Yamamoto, Tokyo (JP); Kiyoshi Ohsato, Chiba (JP); Toshio Watanabe, Kanagawa (JP); Akira Suzuki, Kanagawa (JP)

(73) Assignee: Sony Corporation (JP)

(21) Appl. No.: 09/726,436
(22) Filed: Dec. 1, 2000

Related U.S. Patent Documents

Reissue of:
(64) Patent No.: 6,041,031
Issued: Mar. 21, 2000
Appl. No.: 08/994,455
Filed: Dec. 19, 1997

(30) Foreign Application Priority Data

Dec. 20, 1996 (JP) ..... P08-340904

(51) Int. Cl.
*G11B 7/00* (2006.01)

(52) U.S. Cl. ..... 369/13.32; 369/112.24; 369/44.14; 369/44.23

(58) Field of Classification Search ..... 369/13.32, 369/112.24, 44.14, 44.23
See application file for complete search history.

(56) References Cited

U.S. PATENT DOCUMENTS 5,553,052 A * 9/1996 Oono et al. ..... 369/44.15
5,764,613 A * 6/1998 Yamamoto et al. .. 369/44.23 X
5,881,042 A * 3/1999 Knight ..... 369/44.23 X
5,946,282 A * 8/1999 Hirono et al. ..... 369/44.23 X

* cited by examiner

*Primary Examiner*—Muhammad Edun
(74) *Attorney, Agent, or Firm*—Rader Fishman & Grauer PLLC; Ronald P. Kananen

(57) ABSTRACT

An optical disc recording/reproduction apparatus for recording and/or reproducing a data by applying a beam from an optical head unit through a substrate onto/from a recording layer of the optical disc through, wherein the substrate of the optical disc is 0.3 mm or below; the optical head unit comprises: an objective lens for converging an incident beam and emitting the beam toward the optical disc; a forward lens for converging the beam introduced through the objective lens and applying the beam to the optical disc; a lens holder where the objective lens and the forward lens are fixed; and an actuator for driving the objective lens and the forward lens as a unitary block and controlling at least focusing, the objective lens and the forward lens having a total numerical aperture of 0.8 or above.

11 Claims, 5 Drawing Sheets

$NA_1 = \sin\theta_1$ $(\theta_2 > \theta_1)$ $NA_2 = \sin\theta_2$ $NA_3 = \sin\theta_3$
$= NA_2 = \sin\theta_2$

OPTICAL DISC RECORDING/ REPRODUCTION APPARATUS AND METHOD

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an optical disc recording/reproduction apparatus and method and in particular, to an optical disc recording/reproduction apparatus and method capable of recording or reproducing a data to/from an optical disc with a high density.

2. Description of the Prior Art

In order to record or reproduce a data onto/from an optical disc with a high density, it is necessary to minimize the size of an optical spot applied to the optical disc. The size of an optical spot is known to be proportional to $\lambda/NA$ assuming that $\lambda$ is a wavelength of a light source and NA is a numerical aperture of an objective lens. Consequently, when the wavelength is constant, increase of the numerical aperture of the objective lens increases the possible recording density. The objective lens used as an aspherical single lens in a currently available optical disc apparatus is considered to have a numerical aperture of 0.6 at maximum because of the manufacturing reasons.

Moreover, as the numerical aperture increases, and as the thickness of the optical disc substrate increases, there will be more affects by the wave [font] *front* aberration generated by the inclination or warp of the optical disc and assembly accuracy. For this, when using a lens having a large numerical aperture as an objective lens, it is necessary to reduce the thickness of the optical disc substrate. For example, according to the DVD (digital versatile disc) specification, the substrate thickness is defined as about 0.6 mm.

As an objective lens unit exceeding 0.6 of the numerical aperture, there is known a two-lens unit consisting of a solid immersion lens (SIL) and an objective lens which has been suggested by Kino and others (U.S. Pat. No. 5,125,750). With this two-lens unit, there is suggested an optical disc recording/reproduction optical system having the numerical aperture exceeding 0.8.

In this optical system, it is necessary to maintain a distance (air gap) between the SIL and the optical disc at an optimal value. If this air gap is greatly changed, a wave front aberration is generated, lowering the signal quality and, in the worst case, disabling to record or reproduce a data onto/from the optical disc.

In such an optical system using a two-lens unit, to maintain the air gap constant is equivalent to maintain constant a distance between the two lenses of the lens unit. If the distance between the two lenses of the two-lens unit is to be adjusted by an actuator to cope with a change in the thickness of the optical disc, a complicated configuration is required and it becomes difficult to assure an assembly accuracy.

SUMMARY OF THE INVENTION

It is therefore an object of the present invention to provide a simple configuration using a two-lens unit capable of accurately recording or reproducing a data.

DETAILED DESCRIPTION OF THE PREFERRED EMBODIMENTS

Figure 1:
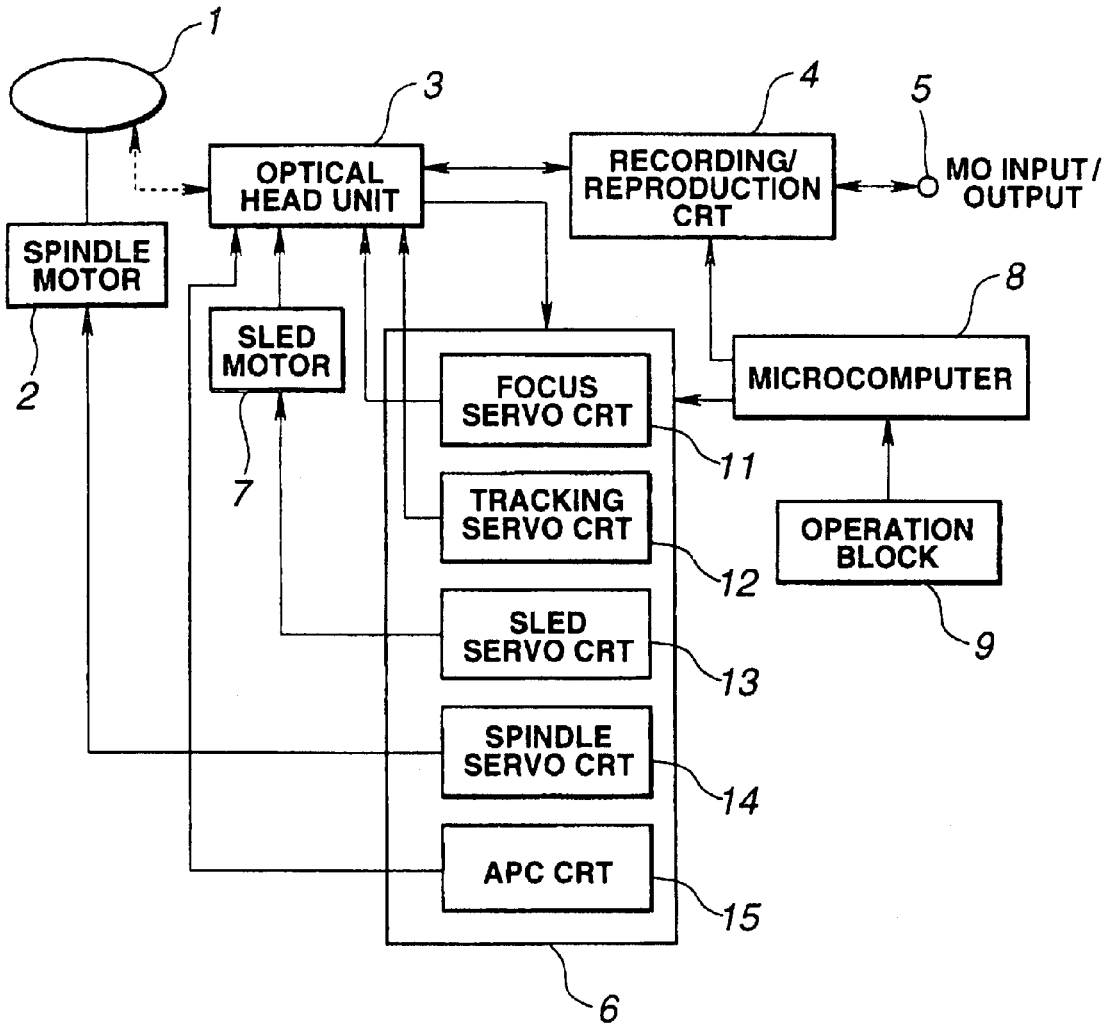
FIG. 1 is a block diagram showing a configuration example of an optical disc recording/reproduction apparatus according to the present invention.

FIG. 1 is a block diagram showing a configuration of an optical disc recording/reproduction apparatus according to an embodiment of the present invention. Note that explanation will be given on the present embodiment for the case when a magneto-optical disc is used as the optical disc. The magneto-optical disc 1 is rotated by a spindle motor 2 at a predetermined velocity. An optical head unit 3 applies a laser beam and a magnetic field to the magneto-optical disc 1 for recording or reproducing a data onto/from the magneto-optical disc 1. A recording/reproduction circuit 4 modulates a recording signal supplied from a terminal 5, for supply to the modulated signal to the optical head unit, and demodulates a reproduction signal from the magneto-optical disc 1 outputted from the optical head unit 3, for output from the terminal 5.

A servo circuit 6 includes a focus servo circuit 11, a tracking servo circuit 12, a sled servo circuit 13, a spindle servo circuit 14, and an automatic power control (APC) circuit 15. The servo circuit 6 reproduces a predetermined error signal from a signal outputted from the optical head unit 3, so as to carry out a servo operation. That is, the focus servo circuit 11 generates a focus error signal from a signal outputted from the optical head unit 3, for example, according to astigmatism, so as to control the optical head unit 3 for focusing according to this focus error signal. The tracking servo circuit 12 generates a tracking error signal from a signal outputted from the optical head unit 3, for example, according to the differential push-pull (DPP) method disclosed in U.S. Pat. No. 4,775,968, and controls the optical head unit 3 for tracking according to this tracking error signal.

The sled servo circuit 13 generates a sled error signal from a DC component of the tracking error signal, and drives a sled motor 7 according to this sled error signal, so as to drive the optical head unit 3 in a predetermined radius position of the magneto-optical disc 1. The spindle servo circuit 14 generates a spindle error signal and drives the spindle motor according to this spindle error signal, so as to rotate the magneto-optical disc 1 at a predetermined velocity. The APC circuit 15 controls so that a built-in laser diode (which will be detailed later) of the optical head unit 3 emits a constant intensity of a laser beam.

A microcomputer 8 controls the respective components according to operation signals from an operation block 9 for carrying out recording or reproduction.

Description will now be directed to the operation of the microcomputer 8. When the operation block 9 is operated to issue an instruction for recording, the microcomputer 8 controls the respective components to start a recording operation. Firstly, the spindle servo circuit 14 of the servo circuit 6 drives the spindle motor 2 to rotate the magneto-optical disc at a predetermined velocity. The optical head unit 3 emits from the built-in laser diode a laser beam to the magneto-optical disc 1 and receives a reflected beam so as to output a signal required for the focus servo and the tracking servo. The focus servo circuit 11 and the tracking servo circuit 12 generates from this signal a focus error signal and a tracking error signal, respectively, for controlling the optical head unit 3 for focusing or tracking.

On the other hand, a recording signal inputted from the terminal 5 is modulated in the recording/reproduction circuit 4 by a predetermined method and supplied to the optical head unit 3. The optical head unit 3 controls the laser diode according to the signal supplied. The optical head unit 3 has a magnetic head (which will be detailed later) which applies a magnetic field having a predetermined bias to the magneto-optical disc 1. As a result, a data is recorded on the magneto-optical disc 1 by a so-called magneto-optical effect. With this data recording, the sled servo circuit 13 controls the sled motor 7 so as to shift the position of the optical head unit 3 in a radius direction of the magneto-optical disc 1. Thus, a data is recorded on the magneto-optical disc 1.

On the other hand, when the operation block 9 is operated to issue an instruction for reproduction, the microcomputer 8 controls the respective components for starting a reproduction operation. The optical head unit 3 reproduces a data from the magneto-optical disc 1 and outputs a reproduction signal. The reproduction signal is supplied to the recording/reproduction circuit 4, where the signal is demodulated and outputted from the terminal 5. The APC circuit 15 monitors a laser beam applied to the magneto-optical disc 1 and controls so that a constant intensity of the laser beam is applied.

It should be noted that the other servo operations of the servo circuit 6 are identical to those of the recording mode.

Figure 2:
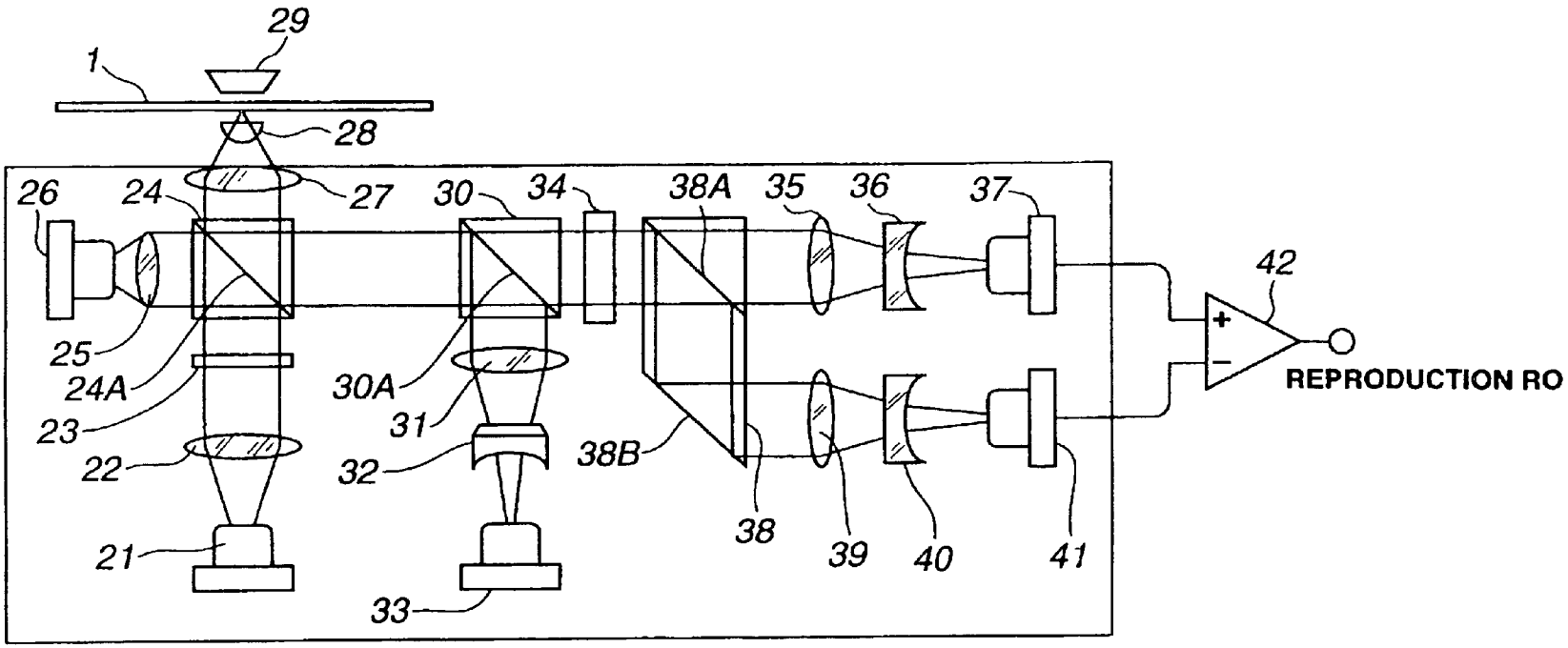
FIG. 2 shows a detailed configuration example of an optical head unit of FIG. 1.

FIG. 2 shows a detailed configuration of the optical head unit 3. The laser diode 21 emits a laser beam having a wavelength of 680 nm for example. A collimator lens 22 converts a divergent beam emitted from the laser diode 21, into a parallel beam. A grating 23 divides the laser beam from the collimator lens 22 into three laser beams. The laser beam emitted from the grating 23 enters a beam splitter 24 where a portion of the beam is reflected by a reflection plane 24A and introduced via a convex lens 25 to an APC photo detector 26.

Another portion of the laser beam which has passed through the reflection plane 24A is converged by an objective lens 27 and applied via a forward lens 28 to the magneto-optical disc 1. On the opposite side of the magneto-optical disc 1 where the laser beam is applied, the magnetic head 29 is arranged so as to apply a magnetic field having a predetermined bias.

The laser beam reflected from the magneto-optical disc 1 is returned via the forward lens 28 and the objective lens 27 to the beam splitter 24, where a portion (30% for example) of a p-polarized component and almost all of an s-polarized component are reflected by the reflection plane 24A and introduced into a beam splitter 30. After the laser beam has entered the beam splitter 30, a portion of the laser beam is reflected by a reflection plane 30A, converged by a convex lens 31, and given astigmatism by a cylindrical lens 32 before being introduced to a servo signal photo diode 33.

On the other hand, another portion of the laser beam which has passed through the reflection plane 30A is introduced via a half wave plate 34 for adjusting light quantity balance, to a polarization beam splitter 38.

From the laser beam which has entered the polarization beam splitter 38, a p-polarized component passes through a reflection plane 38A and is converted by a convex lens 35 before being introduced via a concave lens 36 to a photo detector 37. Moreover, from the laser beam which has entered the polarization beam splitter 38, an s-polarized component is reflected by the reflection plane 38A and further by a reflection plane 38B and converged by a convex lens 39 before being introduced via a concave lens 40 to a photo detector 41. A difference between outputs of the photo detector 37 and the photo detector 41 is calculated by a differential amplifier 42 and is outputted as a reproduction magneto-optical signal.

During a reproduction mode, the laser beam emitted from the laser diode 21 and converted into a parallel beam by the collimator lens 22 is divided into three laser beams by the grating 23 and introduced via the beam splitter 24 to the objective lens 27. The laser beam converged by the objective lens 27 is applied via the forward lens 28 to the magneto-optical disc 1.

In this process, a portion of the laser beam to be applied to the magneto-optical disc is reflected by the reflection plane 24A of the beam splitter 24 and applied via the convex lens 25 to the photo detector 26. The APC circuit 15 of the servo circuit 6 controls power of the laser beam emitted from the laser diode 21 so that the output of the photo detector 26 is at a predetermined reference level.

Figure 3:
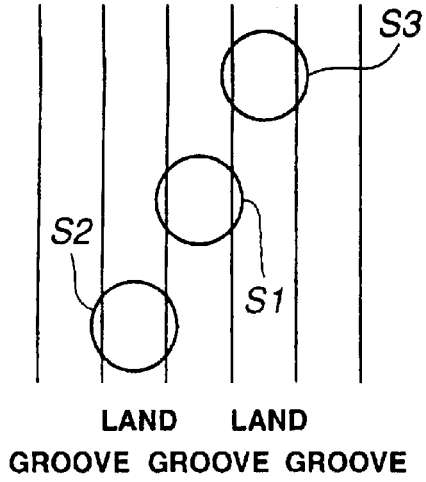
FIG. 3 explains a position of an optical spot.

As shown in FIG. 3, on the magneto-optical disc 1, a center laser beam of the three beams divided by the grating 23 forms an optical spot S1 on a groove (track) where a data is to be recorded or from where a data is to be reproduced, whereas laser beams arranged at right and left of the center beam form an optical spot S2 or S3 on lands positioned at right and left to the groove where the optical spot S1 is formed.

Beams reflected from the optical spots S1, S2, and S3 are introduced via the forward lens 28 and the objective lens 27 to the beam splitter 24, where the beams are reflected by the reflection plane 24A. The laser beam reflected by the reflection plane 24A is introduced into the beam splitter 30, where a portion of the beam is reflected by the reflection plane 30A. The laser beam which has been reflected by the reflection plane 30A is introduced via the convex lens 31 to the cylindrical lens 32 where it is given astigmatism and is introduced to the photo diode 33.

Figure 4:
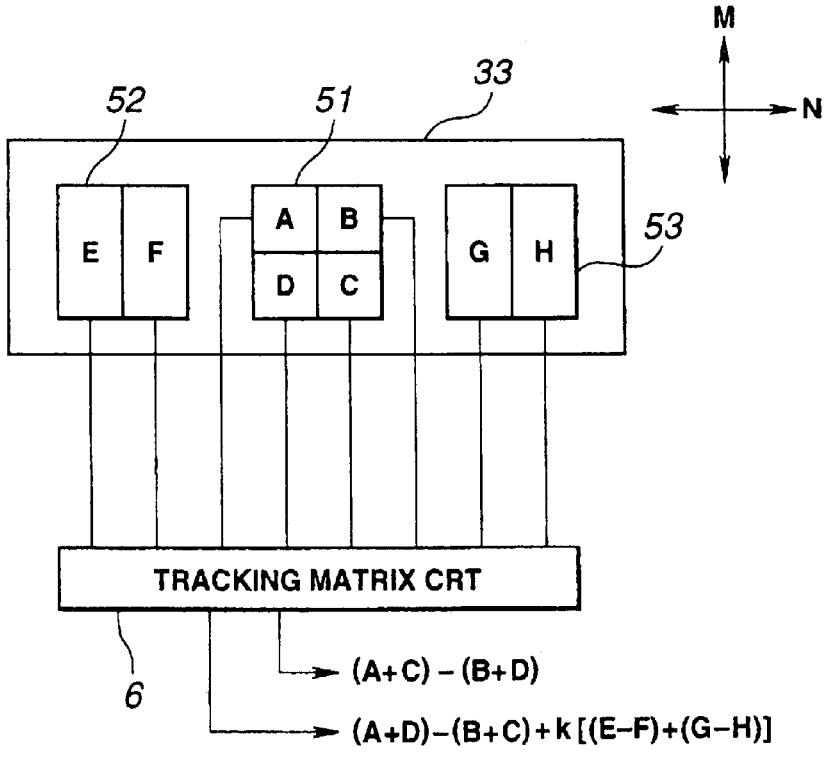
FIG. 4 shows a detailed configuration example of a photo diode 33 of FIG. 2.

As shown in FIG. 4, the photo diode 33 consists of a photo diode 51 for receiving the beam reflected from the optical spot S1 and photo diodes 52 and 53 for receiving the beam reflected from the optical spot S2 or S3. The photo diode 51 is divided in the track direction (indicated by the arrow M) and in the vertical direction (indicated by the arrow N) to the track direction so as to form four regions A to D. The photo diodes 52 and 53 are respectively divided in the track direction so as to form two regions E and F, and G and H.

The focus servo circuit 11 calculates outputs from the regions A to D of the photo detector 51 according to an equation as follows, so as to generate a focus error signal F.

$$F=(A+C)-(B+D)$$

On the other hand, the tracking servo circuit 12 calculates outputs from the regions A to H of the photo diodes 51 to 53 according to an equation as follows, so as to generate a tracking error signal T.

$$T=(A+D)-(B+C)-k[(E-F)+(G-H)]$$

The servo circuit 6 controls an actuator (which will be detailed later) of the optical head unit 3 according to these focus error signal and tracking error signal for carrying out focus control and tracking control.

Most of the beam which has entered the beam splitter 30 passes through the reflection plane 30a and introduced via the half wave plate 34 to the polarization beam splitter 38. From this beam, a p-polarized component is introduced via the convex lens 35 and the concave lens 36 to the photo detector 37, whereas an s-polarized component is introduced via the reflection plane 38A, the reflection plane 38B, the convex lens 39, and the concave lens 40 to the photo detector 41. A difference between the p-polarized component from the photo detector 27 and an output signal component from the photo detector 41 is calculated by the differential amplifier 42 and outputted as a magneto-optical signal to the recording/reproduction circuit 4. The recording/reproduction circuit 4 demodulates the magneto-optical signal supplied and outputs the resultant signal from the terminal 5.

On the other hand, in a recording mode, the laser diode 21 is controlled according to a recording signal. Moreover, the magnetic head 29 applies a magnetic field having a predetermined bias to the magneto-optical disc 1. As a result, at a position where the optical spot Sl is formed on the magneto-optical disc 1, a mark (magnetization) corresponding to a recording data is formed, thus recording the data.

Figure 5:
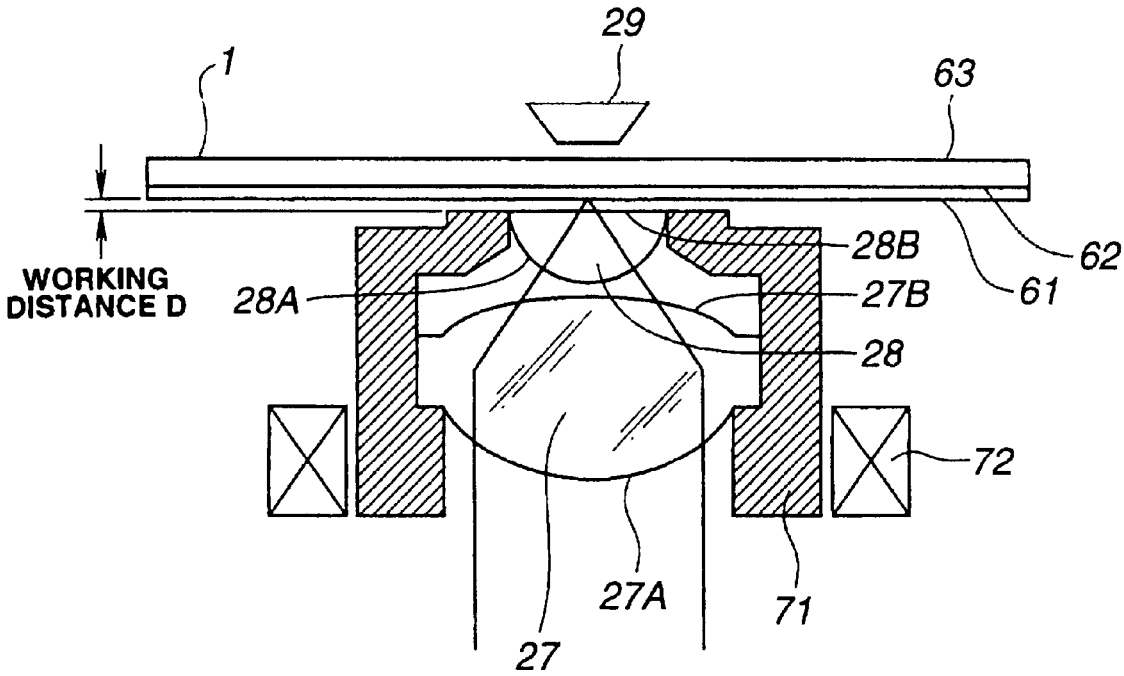
FIG. 5 explains a mounting state of an objective lens 27 and a forward lens 28 of FIG. 2.

FIG. 5 shows a detailed configuration of a movable portion of the optical head unit 3. As shown in FIG. 5, the objective lens 27 and the forward lens 28 are respectively fixed at predetermined positions of a lens holder 71. The objective lens 27 has a numerical aperture of about 0.45. Since this objective lens 27 is used in combination with the forward lens 28, the numerical aperture of the incident is multiplied by about 1.8 and the total numerical aperture of the entire unit consisting of the objective lens 27 and the forward lens 28 is about 0.8.

The mounting positions of the objective lens 27 and the forward lens 28, a distance between these lenses, and a lens assembly error due to a lens inclination angle are determined by the processing accuracy of the lens holder 71. If it is assumed that an optically allowable wave front aberration is $\lambda/4$ ($\lambda$ is a light wavelength), the allowance of the assembly accuracy is as follows: positioning between the lenses ±80 μm; distance between the lenses ±25 μm; and inclination angle ±0.4 degrees. It is possible to obtain this assembly accuracy by a mechanical processing accuracy.

When a data is recorded or reproduced onto/from the magneto-optical disc 1 by using a lens unit (two-lens unit) having a high numerical aperture, the allowance of frame aberration due to the aforementioned inclination of the magneto-optical disc 1 is remarkably lowered if the disc has a thick substrate. That is, as shown in FIG. 5, in the magneto-optical disc 1, on a substrate 61 is formed a recording layer (MO layer) 62, on which is formed a protection layer 63. The laser beam is applied via the substrate 61 to the recording layer 62. In this embodiment, the substrate 61 has a thickness of 0.1 mm. Thus, the substrate 61 is made thin in comparison to a DVD (0.6 mm), enabling to reduce affects of frame aberration to a disc skew even when using a lens unit having a high numerical aperture.

Figure 6A:
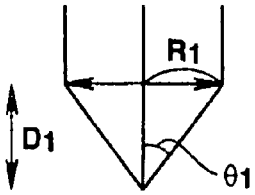
FIG. 6, consisting of FIGS. 6A to 6C, explains the relationship between a lens size and a numerical aperture.
Figure 6B:
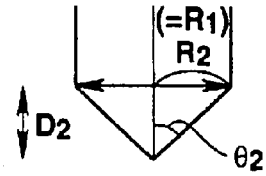

When $\theta$ is assumed to be the lens convergent angle, the numerical aperture NA is defined as $\sin\theta$. Consequently, as shown in FIG. 6, if the lens radius is identical, as the numerical aperture NA increases, the working distance D is decreased. That is, as shown in FIG. 6A and FIG. 6B, if the lens radius is identical R1=R2 and the lens numerical aperture NA1 (=$\sin\theta 1$) of FIG. 6A is smaller than the lens numerical aperture NA2 (=$\sin\theta 2$) of FIG. 6B, the working distance D1 of the former is greater than the working distance D2 of the latter. In this embodiment, the working distance D is set to 100 μm. This working distance is always maintained by driving the actuator 72 arranged around the lens holder 71 according to a focus error signal.

However, as has been mentioned above, if the substrate 61 has an uneven thickness, spherical aberration is caused in the laser beam. Especially in the present embodiment which employs a two-lens unit having a high numerical aperture, quality of the reproduction signal is significantly deteriorated if the thickness of the substrate changes greatly due to factors caused during a disc production. However, if the thickness allowance of the substrate 61 is assumed to be about ±5 μm, the allowance of the substrate having a thickness of 0.1 mm is ±5%, and it is possible to control the thickness of the substrate 61 within this range. In other words, it the substrate 61 has a thickness having an allowance within ±5%, it is possible to reduce the deterioration of the quality of the reproduction signal caused by generation of spherical aberration within a practical use and to realize a magneto-optical disc capable of recording/reproduction with a high density.

It should be noted that since two-lens configuration is employed, it is possible to obtain a high numerical aperture 0.8 to 1.0 of the lens unit. This enables to realize recording/reproduction with a high density.

Each of the surface 27A and surface 27B of the objective lens 27 and the surface 28A of the forward lens 28 is an aspherical surface. As these surfaces are aspheric, it is possible to increase the allowance for the mounting error.

The thickness of the substrate 61 is preferably 0.1 mm to 0.3 mm because if the thickness is great, the affect from skew is increased.

The working distance D is preferably, for example, 50 μm or above, for if it is too small, dusts on the magneto-optical disc may come into contact with the forward lens 28, damaging the forward lens 28.

Figure 6C:
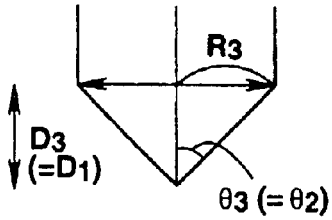

Moreover, as shown in FIG. 6C, if a lens having a greater numerical aperture NA2 (NA2>NA1) is used while realizing a working distance D3 (=D1) which is identical to the working distance D1 of the lens having a smaller numerical aperture NA1, the lens radius R3 becomes greater than the radius R1 of the lens having the smaller numerical aperture NA1. As a result, the entire apparatus becomes of a larger size. Consequently, the value of the working distance d is preferably 500 μm or below. In other words, if a lens having a numerical aperture NA of 0.8 is used to obtain a working distance greater than 500 μm, the lens radius becomes very great which cannot be realized in practice.

It should be noted that the explanation has been given above for the magneto-optical disc, but the present invention is also applicable for an optical disc dedicated for reproduction or an optical disc of phase change type requiring no magnetic head.

As has been described above, according to the optical disc recording/reproduction apparatus claimed in claim 1 and the optical disc recording/reproduction method claimed in claim 4, the thickness of the optical disc substrate is 0.3 mm or below and the total numerical aperture of the objective lens and the forward lens is 0.8 or above so that the objective lens and the forward lens are controlled as a unitary block. This simplifies the apparatus configuration and enables to record or reproduce a data with a high density.

What is claimed is:

1. An optical disc recording/reproduction apparatus for recording and/or reproducing data by applying a beam from an optical head unit through a substrate of an optical disc onto/from a recording layer of the optical disc, wherein said substrate of said optical disc has a thickness of 0.3 mm or below, and said optical head unit comprises:

an objective lens for converging an incident beam and emitting the beam toward said optical disc;

a forward lens for converging the beam introduced through said objective lens and applying the beam to said optical disc;

a lens holder in which said objective lens and said forward lens are fixed; and an actuator for driving said objective lens and said forward lens as a unitary block and controlling at least focusing, said objective lens and said forward lens having (1) a total numerical aperture of 0.8 or above, (2) a center position shift tolerance of ±80 μm, (3) *an assembly accuracy of* a distance between the objective lens and the forward lens of ±25 μm [or less], and (4) inclination angles less than 0.4°.

2. An optical disc recording/reproduction apparatus as claimed in claim 1, wherein said forward lens and said substrate define a working distance of 50 μm to 500 μm.

3. An optical disc recording/reproduction apparatus as claimed in claim 1, wherein said forward lens and said objective lens have aspherical surfaces into/from which said beam is introduced.

4. An optical disc recording/reproduction apparatus as claimed in claim 1, wherein said forward lens and said objective lens are fixed at a predetermined distance in said lens holder.

5. An optical disc recording/reproduction apparatus as claimed in claim 1, wherein said actuator carries out tracking control of said forward lens and said objective lens.

6. An optical disc recording/reproduction apparatus as claimed in claim 1, said apparatus further comprises a magnetic head for applying a magnetic field to said recording layer of said optical disc.

7. An optical disc recording/reproduction method for applying a beam from an optical head having an objective lens for converging and emitting the beam toward an optical disc and a forward lens for converging the beam from said objective lens and emitting the beam to a recording layer through a substrate of said optical disc so as to record or reproduce data onto/from said recording layer, wherein said objective lens and said forward lens are fixed in a holder and are driven as a unitary block for focus control and said substrate of said optical disc a thickness of 0.3 mm or below, and said objective lens and said forward lens have (1) a total numerical aperture of 0.8 or above, (2) a center position shift tolerance of ±80 μm, (3) *an assembly accuracy of* a distance between the objective lens and the forward lens of ±25 μm [or less], and (4) inclination angles less than 0.4°.

8. An optical head unit for applying a beam through a substrate to a recording layer of an optical disc so as to record and/or reproduce data onto/from said recording layer, said optical head unit comprising:

a first lens for converging an incoming beam and emitting the beam toward said optical disc;

a second lens for converging the beam emitted from said first lens and emitting the beam to said optical disc;

a lens holder in which said first lens and said second lens are fixed at a predetermined distance; and an actuator for driving said lens holder so as to carry out at least focus control, wherein said first lens and said second lens have (1) a total numerical aperture of 0.8 or above, (2) a center position shift tolerance of ±80 μm, (3) *an assembly accuracy of* a distance between the first lens and the second lens of ±25 μm [or less], and (4) inclination angles less than 0.4°.

9. An optical head unit as claimed in claim 8, wherein said second lens and said substrate define a working distance of 50 μm to 500 μm.

10. An optical head unit as claimed in claim 8, wherein said first lens and said second lens have aspherical surfaces from/to which said beam is introduced.

11. An optical head unit as claimed in claim 8, wherein said actuator drives said lens holder for carrying out tracking control.

* * * * *